April 3, 1934.  M. H. BALLARD  1,953,067

STARTING AND STOPPING MECHANISM FOR MACHINES

Filed Feb. 6, 1928  2 Sheets-Sheet 1

INVENTOR
Milton H. Ballard
By his attorney,
Nelson Townsend

April 3, 1934.    M. H. BALLARD    1,953,067
STARTING AND STOPPING MECHANISM FOR MACHINES
Filed Feb. 6, 1928    2 Sheets-Sheet 2

INVENTOR
Milton H. Ballard
By his Attorney,
Nelson W. Howard

Patented Apr. 3, 1934

1,953,067

UNITED STATES PATENT OFFICE 1,953,067

STARTING AND STOPPING MECHANISM FOR MACHINES

Milton H. Ballard, Beverly, Mass., assignor to United Shoe Machinery Corporation, Paterson, N. J., a corporation of New Jersey Application February 6, 1928, Serial No. 252,252

5 Claims. (Cl. 192—17)

This invention relates to machines for operating upon sheet material, and is herein illustrated as embodied in a clicking machine of the type disclosed in United States Letters Patent No. 921,503, granted May 11, 1909, on application of Arthur Bates. It is to be understood, however, that the invention is not limited to machines of the type referred to but is adapted to use in connection with machines of other types.

Clicking machines of the type set forth in the aforementioned Letters Patent comprise a cutting block for supporting leather or other sheet material, and a presser member mounted upon a post and arranged for movement into and out of operative relation to a freely movable die positioned by the operator upon the material. In producing cutting operations upon the material, the post is reciprocated by means of an eccentric mounted on a shaft driven by a pulley or a fly-wheel, connection being made between the shaft and fly-wheel by a one-revolution clutch operable at the will of the operator. Such machines have been equipped with a brake comprising a strap running around the shaft and operatively connected to the post so that at the end of one revolution of the shaft the brake is rendered effective to bring the parts to rest with the presser member substantially in its highest position above the work.

In view of the foregoing, an object of the present invention is to provide starting and stopping mechanism for an improved clicking machine which, without sacrificing any of the characteristic advantages of such mechanisms heretofore in use, will be effective to reduce the amount of power required for operation while making it practicable to reduce the size of various parts of the machine.

To this end and as illustrated, the invention provides an improved clicking machine comprising a shaft, a brake drum upon the shaft, a brake strap, and means for tightening the brake strap around the drum at the end of a single revolution of the shaft, together with means for releasing the brake strap prior to rotation of the shaft. Preferably and as shown, the mechanism for operating the brake strap comprises a brake lever normally operatively connected to an eccentric on the shaft by means of a latch in such manner that the brake strap will be applied to the drum after the single revolution of the shaft. Operator-controlled starting mechanism is provided for initiating operation of the shaft, and for releasing the latch prior to rotation of the shaft to render the brake lever inoperative for applying the brake. The force for releasing the brake is applied at the end of the brake lever farthest from the brake, thus requiring a minimum amount of effort on the part of the operator to release the force with which the brake is held.

By the construction above referred to the drag of the brake upon the shaft is eliminated, thus avoiding waste of power. Furthermore, the size of the flywheel required is not as great as in clicking machines heretofore constructed for the reason that the shaft is not started under a brake load and accordingly less stored energy in the driving parts is required.

Thus the invention provides a clicking machine which, while retaining the characteristic advantages of construction of the machines above referred to, especially with reference to the manually operable starting mechanism, is particularly economical in operation.

Other objects and features of the invention will be apparent from the following detailed description taken in connection with the accompanying drawings, in which Fig. 1 is a side elevation, partly in section, of a clicking machine constructed according to the invention;

Figure 1:
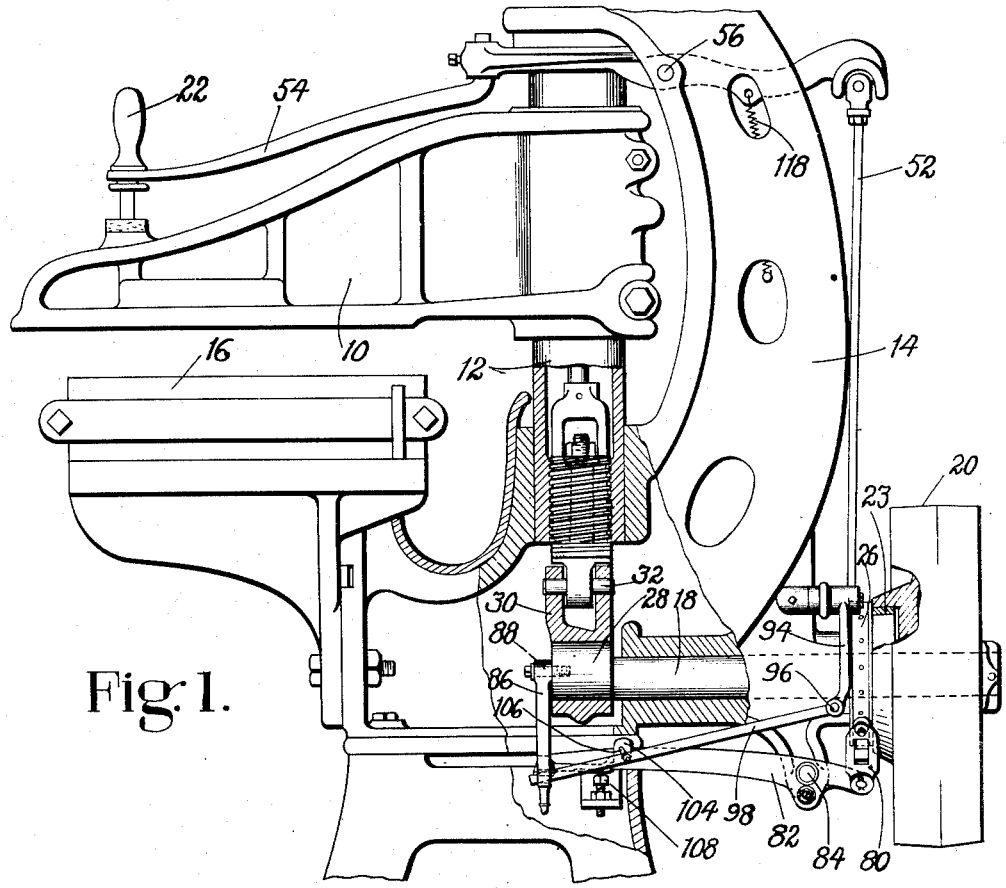

The invention is herein illustrated as embodied in a clicking machine of the type set forth in the aforementioned United States Letters Patent No. 921,503, to which reference may be had for a detailed description of the construction and operation of parts not fully described herein. As shown in Fig. 1, the illustrated machine comprises a presser member 10 secured to a post 12 suitably journaled in a frame 14 so that the presser member 10 can be swung transversely over a cutting block 16 and be brought into operative relation to a freely movable die positioned as may be desired on material on the cutting block. The post 12 is reciprocated by a shaft 18 driven by a fly-wheel 20 to which the shaft is operatively connected, upon actuation of starting handle 22, by means of a clutch 23. The clutch is disengaged from the fly-wheel 20 at the end of a single revolution of the shaft 18 by a clutch control member 24 (Fig. 2), the post 12 being brought to rest through operation of a band brake 26.

For reciprocating the post 12 the inner end of the shaft 18 is formed with an eccentric 28 upon which is mounted a forked link 30 pivotally secured to the lower end of the post 12 by a pin 32.

The fly-wheel 20 is loosely mounted upon the outer end of the shaft 18 and is adapted to be continuously driven by a belt or by an electric motor, not shown.

Figures 2, 3, 4:
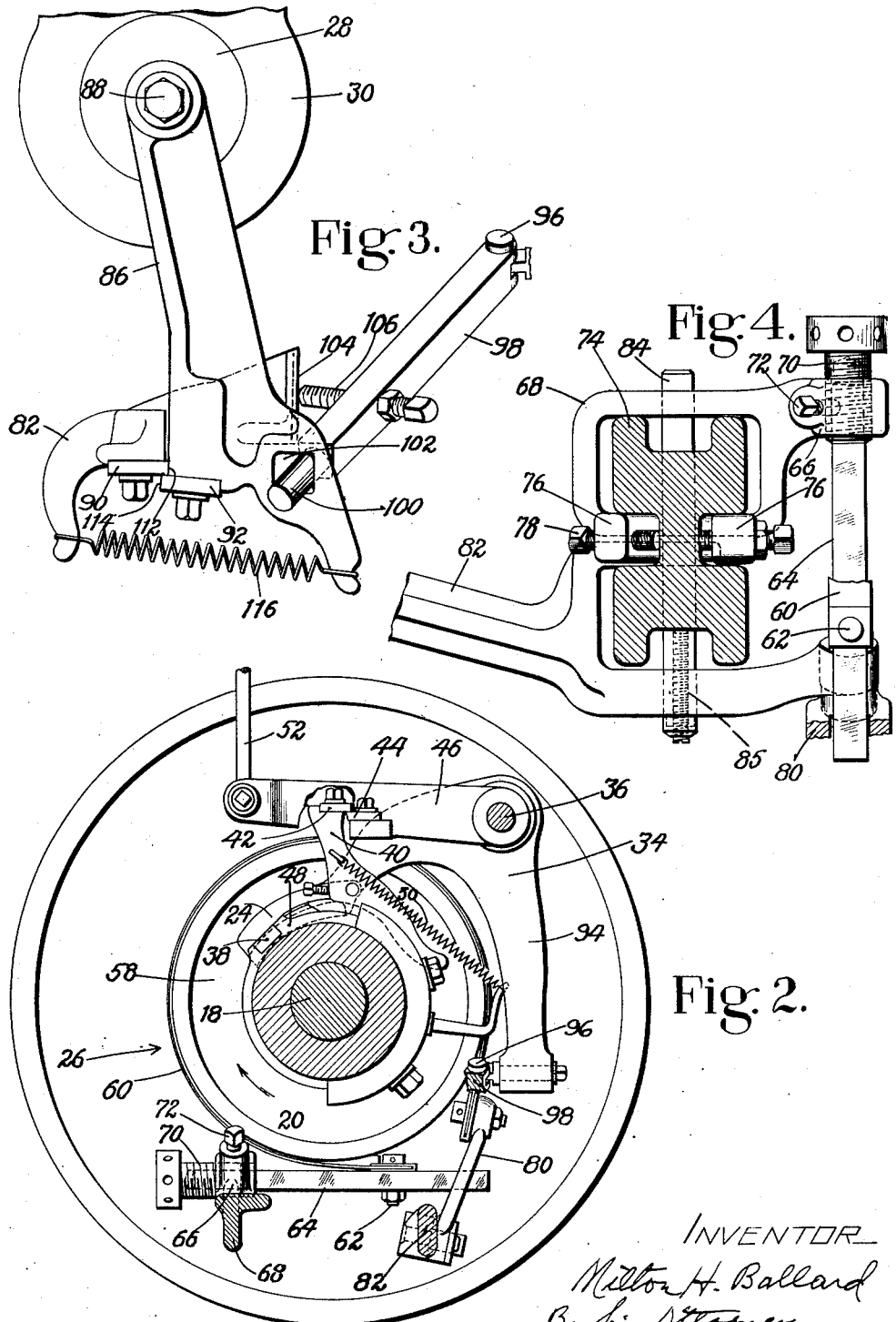
Fig. 2 is a detail view of brake and clutch operating mechanism.
Fig. 3 is an end view of latch mechanism for releasing the brake.
Fig. 4 is a detail view showing means for supporting a brake lever and the fixed end of a brake strap.

The clutch 23 for connecting the shaft to the fly-wheel is not shown in detail but is of the one-revolution type, and is fully disclosed in United States Letters Patent No. 1,475,926, granted December 4, 1923, upon an application filed in my name. The control member 24 for operating the clutch, as shown in Fig. 2, forms part of a bell-crank lever 34 which is loosely mounted on rock-shaft 36, and normally engages a clutch-operating pin 38 in such a way as to prevent movement of the pin under the force of a spring, not shown, tending to expand the clutch 23 within the fly-wheel 20. When the member 24 is moved out of engagement with the pin 38 the latter is forced inwardly by said spring to cause the clutch 23 to engage the fly-wheel.

For operating the control member 24 a floating lever 40 is pivoted thereto and has at its upper end a latch plate 42 above and normally in engagement with a similar latch plate 44 borne by arm 46 secured to the rock-shaft 36. The construction and arrangement of parts are such that rotation of the rock-shaft 36 in a clockwise direction through operation of lever 46, latch plates 42 and 44, and lever 40 causes similar movement of the bell-crank 34, raising the control member 24 and thereby initiating operation of the clutch 23. As the shaft 18 rotates the lower end of lever 40 strikes a cam 48 which rocks the lever 40, thereby disengaging the latch plates 42 and 44 with the result that the lever 40 drops into position to pull out the pin 38, releasing the clutch 23 when the shaft 18 completes a single revolution, a spring 50 acting upon the lever 40 to return the latch plate 42 into position above the plate 44.

The clutch mechanism above described is arranged for manual operation by means of connections leading to the starting handle 22. To this end, one end of a rod 52, Figs. 1 and 2, is pivoted to the arm 46, the other end of the rod making connection with the starting handle 22 by means of a composite lever 54 mounted on pin 56 in the frame 14. Thus a depression of the starting handle 22 will result in a single revolution of the shaft 18 effecting reciprocation of the post 12 to move the presser member 10 into operative relation to the cutting block 16 and to return the member 10 into inoperative position.

For bringing the post 12 to rest with the presser member 10 in inoperative position above the cutting block 16, the shaft 18 has keyed thereto a brake drum 58 the periphery of which serves as a braking surface in co-operation with a brake strap 60 which is tightened, by means hereinafter described, after the clutch 23 has been released and as the presser member is approaching its highest point above the cutting block. One end of the brake strap 60 is secured by a bolt 62 to a rod 64 carried by a collar 66 formed on a bracket 68 secured to the frame 14. The end of the rod 64 is received in a nut 70 screw-threaded into the collar 66. By adjusting the nut 70 into or out of the collar 66 the rod 64 and consequently the end of the strap 60 can be moved tangentially of the brake drum 58, thus providing means for adjusting the tension of the brake strap. The collar 66 has a set-screw 72 for holding the nut 70 in adjusted position. The bracket 68, as shown in Fig. 4, is substantially in the form of a C the arms of which surround the lower portion of an ear 74 of the frame 14. The ends of the arms of the C are provided with lugs 76 having bolts 78 extending inwardly on opposite sides of the central portion of the ear adapted to secure the bracket thereto. By adjustment of the bolts 78 the bracket 68 with rod 64 and the anchored end of the brake strap 60 can be adjusted toward or away from the brake drum 58. This adjustment provides for the alignment of the brake strap with the periphery of the drum.

The free end of the brake strap 60 passes around the periphery of the drum 58 and is secured to a slotted link 80 through which the end of the rod 64 passes (see Figs. 1, 2 and 4). The mechanism for tightening the strap upon the drum 58 comprises a brake lever 82 pivoted on a pin 84 in the lower portion of the ear 74, side play of the lever 82 being prevented by means of a set-screw 85 passing through the lever and engaging the web of the ear 74. The outer end of the lever 82 is connected to the link 80, the other end being connected by a link 86 to the eccentric 28. The link 86 is pivoted at the axis of the eccentric 28 on a pin 88 and is provided at its lower end with a latch plate 92 (Fig. 3) which normally engages a co-operating latch plate 90 on the brake lever 82. In Fig. 3, the inner end of the brake lever 82 is shown in its uppermost position which is assumed when the post 12 is at rest. In this position the opposite end of the brake lever is depressed, thus pulling downwardly upon the link 80 to tighten the brake strap 60 around the drum 58.

Figure 5:
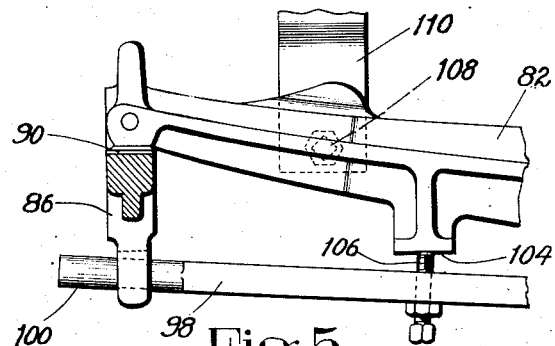
Fig. 5 is a plan view of a portion of the brake-releasing mechanism.

In order to release the brake strap 60 when a clutching operation is initiated thus to prevent drag of the brake strap upon the drum 58 as the shaft 18 commences to rotate, means is provided for unlatching the connection 86 from the end of the brake lever 82, thus permitting the inner end of the brake lever to drop in such a way as to raise the link 80, thereby relieving the tension on the brake strap. To this end the bell-crank 34 (Fig. 2) has an arm 94 making connection through pin coupling 96 with a rod 98 provided with a pin 100 (see Figs. 3 and 5) which extends through an opening 102 in the lower portion of the link 86. The brake lever 82 is provided with an abutment 104 co-operable with a screw 106 extending at right angles from the rod 98.

When the starting handle 22 is depressed to initiate the clutching operation, the bell-crank 34 is moved in a clockwise direction, as has previously been set forth, and the arm 94 moves the outer end of the rod 98 inwardly. The rod 98 fulcrums on the end of the screw 106 in engagement with the abutment 104 in such a way as to move the other end of the rod outwardly with the result that the link 86 is rotated upon the pin 88 to remove the latch plate 92 from beneath the latch plate 90, thus permitting the inner end of the brake lever 82 to drop and thereby effecting the release of the brake strap 60, in the manner above pointed out, before the shaft 18 commences to rotate.

Downward movement of the inner end of the brake lever 82 is limited by means of set-screw 108 carried by bracket 110 extending beneath the lever 82. The set-screw 108 is adjusted to engage the lower surface of the lever 82 when it is released to prevent downward movement of the lever to such an extent that side surface 112 of latch plate 90 will drop below the lower edge of side surface 114 of latch plate 92, a spring 116 being provided to hold said surfaces in contact during the time the lever 82 is released. The spring 116 tends to return the rod 98 and the link 86 to their original positions upon movement of the bell-crank 34 in a contraclockwise direction by a spring 118 acting upon lever 54 when the starting handle 22 is released.

As the post 12 descends with the presser member 10 after the shaft 18 commences to rotate, the eccentric 28 moves the link 86 downwardly, the latch surface 114 passing over the surface 112, and as the post reaches its lowermost position latch plate 92 moves below the lower edge of latch plate 90 and the spring 116 operates to force the plate 92 underneath the plate 90. As the post rises the link 86 also rises carrying with it the latch plate 92 which engages the latch plate 90, thereby raising the inner end of the brake lever 82 and depressing the other end of the lever to tighten the brake strap 60 upon drum 58 and bring the post to rest with the presser member in inoperative position above the cutting block. The throw of the eccentric 28 is such that as the eccentric raises the post 12 to its highest position the link 86, which is pivoted to the eccentric at its axis, is operated to move the inner end of the brake lever 82 the maximum distance upwardly to apply the full force of the brake leverage to the strap 60 in bringing the post to rest.

In the operation of the illustrated clicking machine, depression of the starting handle 22 causes operation of the bell-crank lever 34 first to unlatch the brake lever 82 the inner end of which drops, thereby relieving the tension of the brake strap 60 on the brake drum 58. The lever 34 then raises the clutch control member 24 to throw in the clutch 23, thereby operatively connecting the shaft 18 to the continuously revolving flywheel 20. The shaft 18 through the eccentric 28 causes a reciprocation of the post 12 to produce a pressure-applying operation of the presser member 10 upon a die operatively positioned upon work carried on the cutting block 16. At the end of one revolution of the shaft 18 clutch control member 24 throws out the clutch 23 to disconnect the fly-wheel from the shaft. As the post 12 is moved upwardly the link 86 raises the inner end of the brake lever 82, thereby pulling down on the free end of the brake strap 60 to bring the shaft 18 to rest with the post in its upper position.

By releasing the brake before the shaft commences to rotate there is no drag of the brake upon the shaft thereby avoiding a waste of power. Also, since less momentum of driving parts is required than would be the case if the brake were not released, a smaller fly-wheel can be used.

It is to be noted that the brake lever 82 is fulcrumed close to the brake drum 58 at a point a considerable distance away from the application of power so that the leverage obtained is approximately 4:1 with the result that the force required for disengaging the link 86 from the brake lever 82 is considerably less than the tension on the brake strap. Consequently, the force required to depress the starting handle 22 to release the brake tension is comparatively small. Thus the invention provides a machine which is economical to operate but which does not sacrifice any of the characteristic advantages of machines of the type referred to as heretofore constructed.

Having described the invention, what I claim as new and desire to secure by Letters Patent of the United States is:—

1. A starting and stopping mechanism for machines comprising a shaft, means for driving the shaft, a brake drum carried by the shaft, a strap passing around the brake drum and having one end secured to the frame of the machine, a brake lever having its outer end secured to the free end of the strap, a link operatively connected to the shaft, members making a latch connection between the link and the inner end of the brake lever thereby rendering the brake lever normally effective to tighten the strap on the brake drum, manually operable means for disengaging the latch members thereby to release the brake, and means associated with the shaft for causing engagement of the latch members to render the brake lever operable to tighten the strap around the drum.

2. A starting and stopping mechanism for machines comprising a shaft, means for driving the shaft, a brake drum carried by the shaft, a brake strap passing around the drum, a lever having its outer end connected to one end of the strap, a latch plate carried by the outer end of the lever, a link operatively connected to the shaft and having a latch plate co-operable with the latch plate carried by the lever normally to hold the lever in operative position to tighten the brake strap around the drum, a manually operable member for unlatching the link from the lever thereby relieving the tension on the brake strap, and means for rendering the link operative again to engage the lever in a brake-applying operation at the end of one revolution of the shaft.

3. Starting and stopping mechanism for clicking machines comprising a frame, a shaft mounted in the frame, an eccentric carried by the shaft, a fly-wheel loosely mounted on the shaft, a clutch for connecting the fly-wheel to the shaft, a brake drum carried by the shaft, a brake strap passing around the drum and having one end thereof secured to the frame, a brake lever pivoted to the frame and having its outer end connected to the free end of the brake strap, and a link connection between the eccentric and the inner end of the brake lever for operating the lever to tighten the brake strap around the drum as the shaft approaches the end of a single revolution.

4. Starting and stopping mechanism for clicking machines comprising a frame, a shaft mounted in the frame, an eccentric secured to the shaft, a brake drum carried by the shaft, a brake strap passing around the drum and having one end thereof secured to the frame, a brake lever pivoted to the frame and having its outer end connected to the free end of the brake strap, a connection pivotally secured to the eccentric at the axis thereof and having at its lower end a latch plate, and a latch plate on the inner end of the brake lever arranged for co-operation with the first-mentioned latch plate so that operation of the eccentric is effective in operating the lever to tighten the brake strap around the drum to bring the shaft to rest at the end of a single revolution thereof.

5. Starting and stopping mechanism for machines comprising a frame, a rotary shaft, a brake drum on the shaft, a brake strap, an eccentric on the shaft, means for tightening the brake strap around the drum comprising a brake lever and a latch normally operatively connecting the brake lever to the eccentric for causing application of the brake strap to the drum after a single revolution of the shaft, and operator-controlled means for initiating operation of the shaft and for releasing the latch prior to rotation of the shaft.

MILTON H. BALLARD.

CERTIFICATE OF CORRECTION.

Patent No. 1,953,067.  April 3, 1934.

MILTON H. BALLARD.

It is hereby certified that error appears in the printed specification of the above numbered patent requiring correction as follows: Page 1, line 32, strike out the words "an improved" and insert the same before "starting" in line 31; and that the said Letters Patent should be read with this correction therein that the same may conform to the record of the case in the Patent Office.

Signed and sealed this 19th day of June, A. D. 1934.

Bryan M. Battey (Seal)  Acting Commissioner of Patents.